United States Patent [19]

Conrad

[11] Patent Number: 5,202,673
[45] Date of Patent: Apr. 13, 1993

[54] SECURITY METHOD AND APPARATUS

[75] Inventor: Rodney Conrad, Arvada, Colo.

[73] Assignee: Valve Security Systems, Inc., Westminster, Colo.

[21] Appl. No.: 627,725

[22] Filed: Dec. 14, 1990

Related U.S. Application Data

[63] Continuation-in-part of Ser. No. 408,760, Sep. 19, 1989, abandoned.

[51] Int. Cl.$^5$ .............................................. G08B 25/00
[52] U.S. Cl. .................................... 340/524; 340/505; 340/517; 340/555; 340/556; 340/568; 137/551; 137/554
[58] Field of Search ......................... 340/555–557, 340/568, 571, 550, 548, 524, 505, 517; 137/554, 551; 359/127, 143

[56] References Cited

U.S. PATENT DOCUMENTS

| | | | |
|---|---|---|---|
| 878,103 | 2/1908 | Nolen | 340/289 |
| 3,717,171 | 2/1973 | Fawkes | 137/554 |
| 3,789,876 | 2/1974 | Kempton et al. | 137/554 |
| 4,207,561 | 6/1988 | Steensma | 340/600 |
| 4,234,879 | 11/1980 | Baker | 340/686 |
| 4,262,284 | 4/1981 | Stieff et al. | 340/568 |
| 4,447,123 | 5/1984 | Page et al. | 340/555 |
| 4,521,767 | 6/1985 | Bridge | 340/555 |
| 4,523,186 | 6/1985 | Flarman | 340/555 |
| 4,633,235 | 12/1986 | Le Gennaro | 340/568 |
| 4,639,713 | 1/1987 | Kitagawa | 340/63 |
| 4,665,386 | 5/1987 | Haws | 340/540 |
| 4,721,131 | 1/1988 | Ciordinik et al. | 340/556 |
| 4,812,810 | 3/1989 | Query | 340/545 |
| 4,878,045 | 10/1989 | Tanaka et al. | 340/556 |
| 4,920,334 | 4/1990 | DeVolpi | 340/568 |
| 5,013,908 | 5/1991 | Chang | 340/550 |

*Primary Examiner*—Donnie L. Crosland
*Attorney, Agent, or Firm*—Rosen, Dainow & Jacobs

[57] ABSTRACT

The present invention includes a continuous optical fiber secured to the movable control member and a connector unit which transmits and detects a light signal at opposite ends of the optical fiber and converts the detected light signal into an electrical signal. More specifically the present invention also includes apparatus for allowing authorized movement of the control member as well as means for detecting unauthorized movement of the control member. A preferred embodiment includes an optical fiber that is adapted to be secured to a movable control member of a valve and secured at each end to respective terminals on a connector unit. The length of the loop, optical fiber, and the position of the terminals and connector until are selected so that moving the movable control member of the valve interrupts the light path provided by optical fiber between the terminals to which the ends of the fiber are attached. A light source and a light detector circuit are located near the valve being monitored, and any interruption of the light path between this emitter and detector will produce an alarm signal. The alarm signal continues until that alarm signal is reset at a control panel. A preferred embodiment encodes the light provided by the light source to provide tamper-proof operation. In a particular embodiment, circuitry are provided for transmitting, detecting and converting pulses of light into electrical signals and for processing the electrical signals. Circuitry is also provided that distinguishes among electrical signals representative of the detected light pulses and the absence of detected pulses due to removal or breakage of an optical fiber.

11 Claims, 7 Drawing Sheets

FIG.6

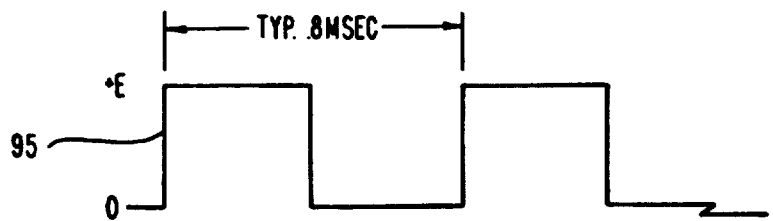
FIG. 7A
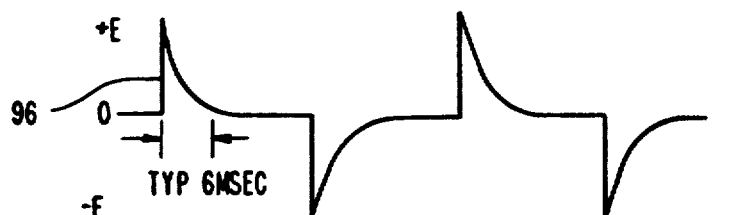
FIG. 7B
FIG. 7C
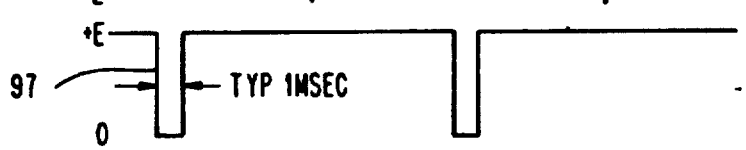
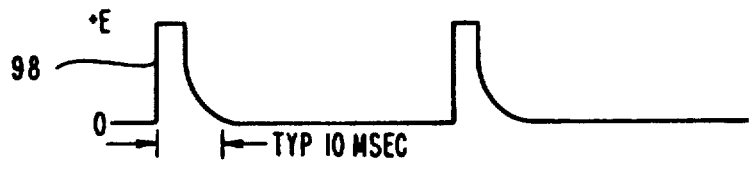
FIG. 7D
FIG. 7E
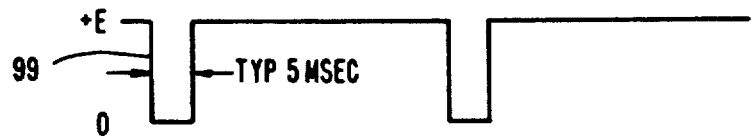
FIG. 7F
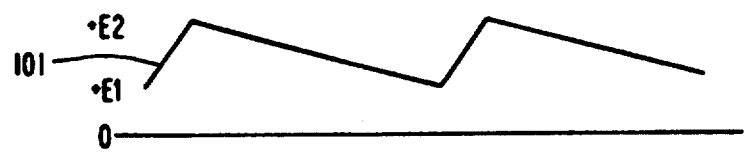
FIG. 7G

SECURITY METHOD AND APPARATUS

RELATED APPLICATIONS

This application is a continuation-in-part of our earlier filed patent application, Ser. No.; 408,760, filed Sep. 9, 1989 now abandoned.

BACKGROUND OF THE INVENTION

1. Field of the Invention

The present invention is related to valve position monitors for fluid distribution and process control systems. More particularly, the present invention is directed to a method and apparatus that provides an alarm when the position of a valve or movable member is changed.

2. Discussion of Related Art

Electrical signaling systems for detecting a change in the position of a valve actuator are well known. For example, U.S. Pat. No. 4,721,131 discloses a valve security system having optical or electrical sensor devices installed on the axially-movable stem of each valve. This sensor device includes an adjustable lever which permits the device to be adapted for use with different valve stem diameters and valve stems having different thread pitches. However, this device must be mounted on the valve stem, which means it cannot be used if the valve stem does not have sufficient length to accommodate the sensor device. Furthermore, this is a complex device requiring precisely-formed mechanical parts, which increase the cost of the device.

U.S. Pat. No. 4,234,879 discloses a simple device suitable for monitoring handwheel-type valves regardless of the length of the valve stem. With this device, however, the movement of the handwheel causes the device to break an electrical circuit by disconnecting conductors in the plug and socket elements of the device. This is unacceptable in many applications, in that breaking the circuit between these conductors involves risks of spark and shock, and possibly also the shorting of the plug prongs to ground. In hospital, chemical manufacturing and laboratory environments, such a risk of sparks and shorting is unacceptable.

SUMMARY OF THE INVENTION

Accordingly, it is an object of the present invention to provide a security apparatus with a movable control member to provide an alarm or signal representative of when the control member of the apparatus has been tampered with.

It is a further object of the present invention to provide a monitoring system that can be retrofitted on many different kinds of valves, valves for either liquids, gases or other movable members. In particular, it is an object of the present invention to provide a tamper-proof monitoring system that does not interfere with operation of the device by authorized persons.

It is a further object of the present invention to provide simple device monitoring apparatus that can detect the movement of a control member without producing sparks and without the risk of shock.

It is still a further object of the present invention to provide a low power security apparatus that detects any tampering with a control member of a plurality of valves, electrical boxes, etc.

To accomplish these objectives, the present invention includes a continuous optical fiber secured to the movable control member and a connector unit which transmits and detects a light signal at opposite ends of the optical fiber and converts the detected light signal into an electrical signal. More specifically the present invention also includes means for allowing authorized movement of the control member as well as means for detecting unauthorized movement of the control member.

A preferred embodiment includes an optical fiber that is adapted to be secured to a movable control member of a valve and secured at each end to respective terminals on a connector unit. The length of the loop, optical fiber, and the position of the terminals and connector unit are selected so that moving the movable control member of the valve interrupts the light path provided by the optical fiber between the terminals to which the ends of the fiber are attached.

A light source and a light detector circuit are located near the valve being monitored, and any interruption of the light path between this emitter and detector will produce an alarm signal. The alarm signal continues until that alarm signal is reset at a control panel. A preferred embodiment encodes the light provided by the light source to provide tamper-proof operation.

In a particular embodiment, circuitry means are provided for transmitting, detecting and converting pulses of light into electrical signals and for processing the electrical signals. Circuitry is also provided that distinguishes among electrical signals representative of the detected light pulses and the absence of detected light pulses due to removal or breakage of an optical fiber.

BRIEF DESCRIPTION OF THE DRAWINGS

The features and advantages of the present invention may be more clearly understood when the description of preferred embodiments of the invention provided below is considered in conjunction with the drawings provided, wherein:

FIG. 6 is the circuitry schematic diagram of the system of FIG. 5; and

FIGS. 7A-7G are waveforms associated with the system of FIG. 5 to illustrate its operation.

DETAILED DESCRIPTION OF PREFERRED EMBODIMENTS

Figure 1:
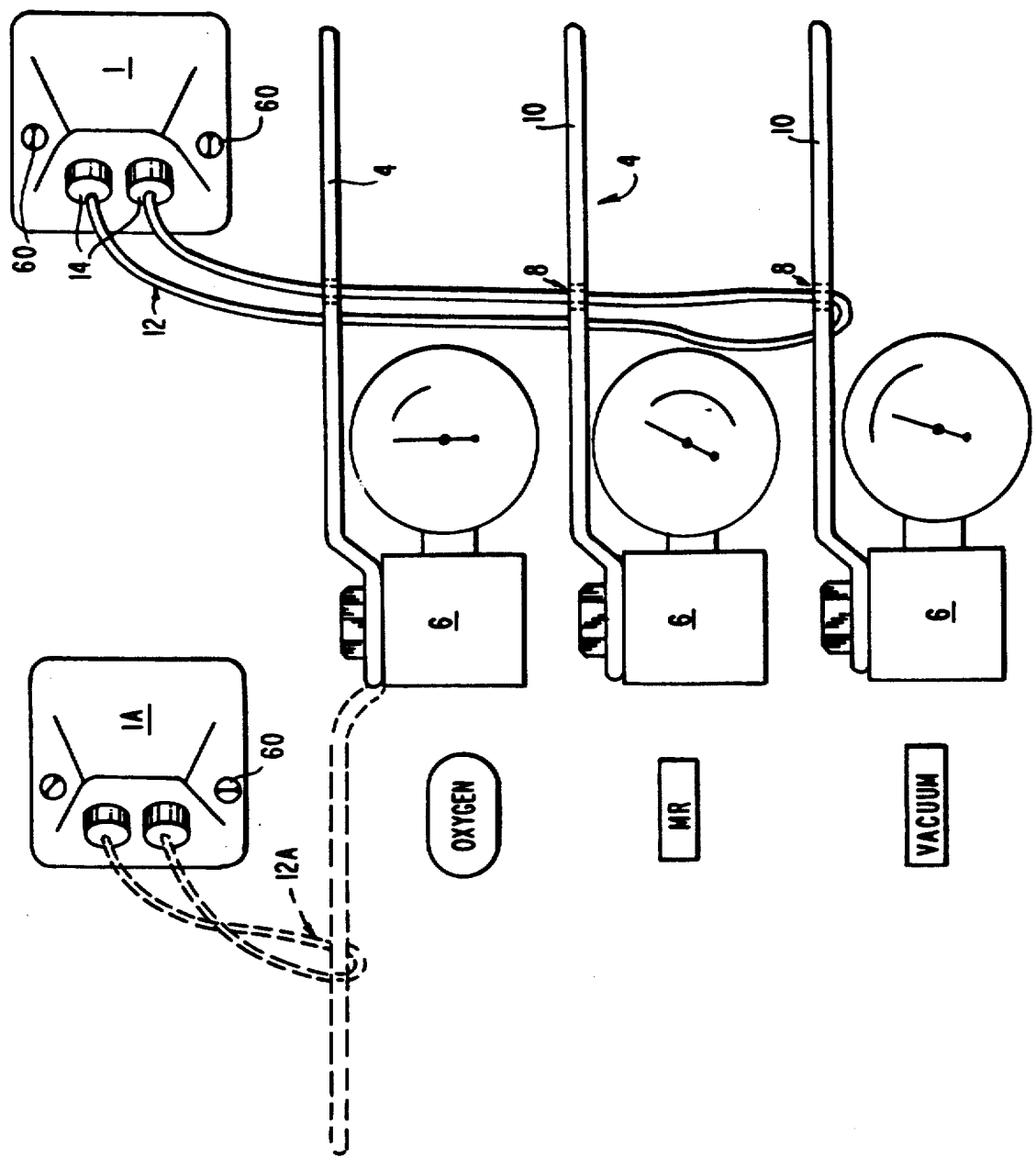
FIG. 1 shows a detector unit in accordance with the present invention.

FIG. 1 shows a connector unit 1 and fiber optics cable 12 connected to a lever handle 4 (or elongated handle) of a plurality of valves 6 through a small hole 8 (or aperture) located above the grip portion 10 of each handle 4. The aperture 8 is near the free end of the handle 4. The fiber optics cable 12 (or optical fiber) is threaded through the aperture. The fiber optics cable can be secured to a plurality of movable control members as shown or to a single movable control member. The position of the connector unit 1 and the length of a fiber optic cable 12 are selected so as to either detect any movement of the valve handle 4 from a particular position, or to limit movement of the handle to a particular range. The thin fiber optic cable 12, preferably comprising a single 1.0 mm fiber insulated by an opaque plastic cover, is connected (or secured) to two terminals or openings (not shown) of the connector unit 1 by optical fiber compression nuts 14 at each end of the cable 12. These compression nuts 14 secure the two ends of the cable 12 to the connector unit 1 so that the light provided by one portion of the connector unit 1 is received through the cable 12 by another portion of the connector unit 1, as described below with reference to FIGS. 3 and 3A. Preferably, the securing means comprise means for push fitting or lightly securing the optical fiber ends onto the terminals of the connector unit. For clarity, we will be using a hospital setting as a model, but the invention is not limited to any particular setting or environment.

In a medical emergency, cable 12 attached by compression nuts (or push fitting means) 14 is easily pulled by hand out of the connector unit 1 to release the valve handle 4. Thus, securing the valve handle 4 does not interfere with the ability of medical personnel to readily control the valve 6.

The connector unit 1 is connected to an alarm monitoring panel that shows an operator what alarm condition exists, and where it is. Furthermore, a message is displayed identifying what corrective action is required by the alarm. The alarm monitoring panels can be in the connector units themselves as well as in a remote panel, as later described in the alarm annunciator panel. In a hospital setting, those who may be called upon to operate the system include security guards, maintenance personnel and nursing staff, as well as physicians who may only make a brief visit to the floor a few times a week. Therefore, it is very important that its operating procedures be clear and simple, and that the operation of the alarm monitoring device be as user friendly as possible.

Figure 2:
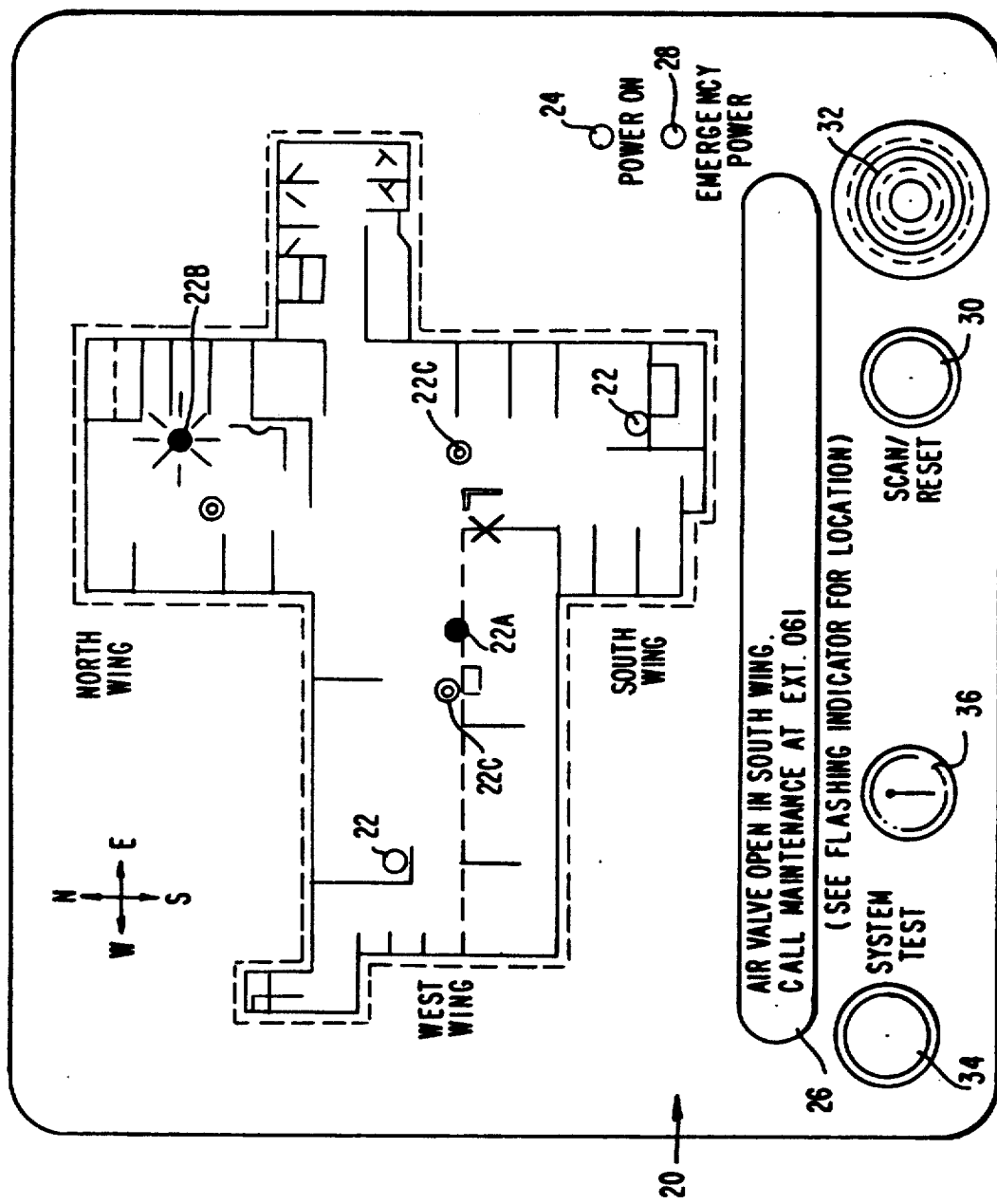
FIG. 2 shows an annunciator panel in accordance with the present invention.

FIG. 2 shows an alarm annunciator panel 20, remote from the connector units, installed on a wall at a nursing station on a hospital floor. The annunciator panel 20 contains a plurality of light-emitting diodes (LED's) 22 showing the location of valves, connector units, and other utility system controls on a floor plan of a particular floor of the hospital. Two additional indicator lights are also provided on the panel 20: a green LED pilot light 24 that remains on at all times to confirm that the alarm system is active, and a yellow LED 28 that lights only when a battery back up system is in use.

When the light path of a connector unit 1 is interrupted, or not received by a transmitting connector unit, an audible alarm is sounded and the corresponding alarm location light 22 is lighted to show the location of the affected valve 6. The LED is also pulsed when it is first lighted, as will be explained further below.

Pressing the reset button 30 once after the alarm occurs deactivates the audible alarm 32 for that particular connector unit. This allows the operator to acknowledge the alarm and take action without further disturbing others on the hospital floor. The audible alarm must be canceled for each alarm that is received, and each location light 22 must be individually reset after an alarm condition is corrected. This additional reset actuation provides confirmation by the authorized staff that the alarm condition has been corrected. Pressing the reset button 30 after the alarm condition indicated by the flashing light 22b has been corrected cancels that particular alarm completely. Thus, the procedure provides for silencing the alarm without canceling the alarm as well as means for canceling the alarm completely.

Below the floor plan diagram on the annunciator panel 20, an 80-character liquid crystal display (LCD) panel 26 provides a message describing the condition that is causing the alarm at the location indicated by the flashing LED. The display panel 26 also instructs the operator how to correct the condition indicated by the flashing light 22b. If more than one alarm is received, the display panel 26 will provide instructions for the most recent alarm condition, and the most recent alarm will be indicated on the floor plan by the flashing light 22b. The location of the previous alarm will be indicated by a steadily lighted LED 22a. To view the messages corresponding to alarms indicated by other lighted LED's 22, the operator presses the scan/reset button 30, which then polls the lighted LED's 22a one at a time, shifting the flashing light 22b to the LED corresponding to the next most recent alarm each time the button 30 is pressed. After all the lighted LED's 22a have been polled, the next actuation of the scan/reset button 30 returns the display panel message and the flashing LED 22b to the first alarm.

The alarm control panel 20 also monitors master utility control panels for each wing of the floor. These master control panels may include a main sprinkler valve and a main power disconnect for the auxiliary generator power that the hospital uses to backup critical functions in the event of a brownout or power failure in the AC power source. The area of the floor controlled by each of these master control panels is outlined in red to indicate the area affected by any emergency at the master control panel for that wing. The indicator lights 22c for these master control panels are also distinguished by a red circle around the light. Thus, when one of these master control lights 22c indicates that an alarm condition exists, the operator will know immediately that the entire area outlined in red is affected by the alarm condition.

The security system further comprises means for providing an emergency power alarm, means for silencing the emergency power alarm that is separate from means for canceling the first alarm and a lock for securing the means for silencing the emergency power alarm. If a failure to incoming power occurs, the yellow light 28 on the annunciator panel 20 will light and the audible alarm will sound to alert the operator. The audible alarm cannot be canceled by the scan/reset button 30 in this instance. The reset switch 36 for this alarm requires a key (not shown) that is kept at the central maintenance facility. This assures that the maintenance staff responds promptly to correct the cause of the power emergency, thereby reducing the risks inherent in reliance on an emergency power source. The alarm resets automatically when the power system returns to normal operation.

Figure 3:
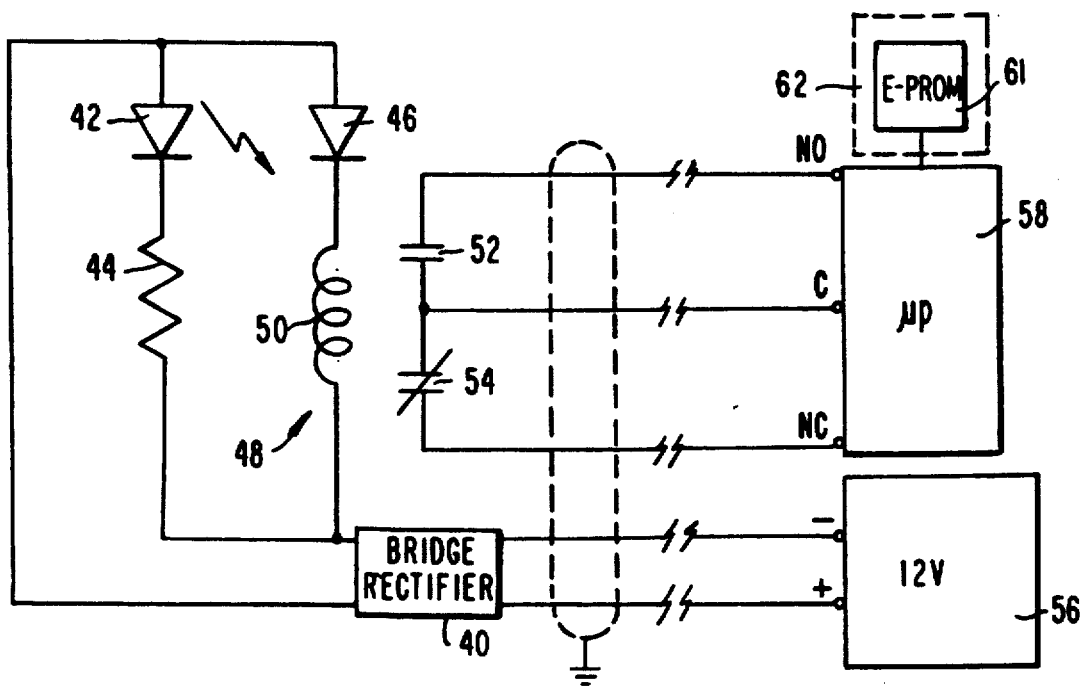
FIGS. 3 and 3A are schematic circuit diagrams of circuits for a security apparatus in accordance with the present invention.

With reference to FIG. 3, a connector unit comprises a detector unit which comprises a bridge rectifier 40, a light-emitting diode (LED) 42, a load resistor 44, a photodiode 46, and a reed relay 48 comprising a coil 50 and normally-open and normally-closed contacts 52, 54, respectively. The bridge rectifier 40 provides steering diodes that protect the connector from inadvertent reverse polarization of the circuit during installation.

On the underside of one embodiment of the connector unit 1 are five electrical contacts: two for a 12-volt supply voltage and three for the reed relay contacts. These connections are potted in an epoxy material at the time the device is manufactured so as to provide a water-proof, explosion-proof connector unit. When the detector unit is installed, these five wires are preferably led through a secure electrical conduit (not shown) to the annunciator panels for that floor of the hospital. Preferably, each of the connector units 1 in the valve monitoring system is surface mounted on a wall over the opening of an electrical conduit, using two security screws 60 (FIG. 1), so that the conduit opening in the wall is not visible. Alternatively the connector units may be connected in a similar, protected manner by an optical cable, in environments where electrical communication is hazardous.

A similar connection may also be provided to a central annunciator panel in the hospital's maintenance facility having one such indicator light 22 for each of the annunciator panels at the nursing stations and an LCD display panel. Thus, maintenance can automatically be notified of events occurring at the nursing stations.

A system test switch 34 is also provided on the annunciator panels 20 at each nursing station. Pressing this test switch 34 lights all LED's, sounds the alarm, and sends an alarm to the central panel. Pressing it again silences the audible alarm and causes the panel to poll the indicator lights 22 one at a time and display the corresponding message for each light until all lights have been polled, and then returns the alarm panel 20 to its normal operating condition when pressed once more. The alarm message displayed on the central annunciator panel must be silenced by pressing its reset button, but the message displayed on the central panel also changes as the indicator lights are polled by the operator at the nursing station, to verify the alarm program information.

At the annunciator panel 20, as shown in FIG. 3, the two 12-volt supply wires from each connector unit 1 are connected to the bridge rectifier 40 and also to a battery back-up unit (not shown) to prevent a failure of the hospital's main AC voltage supply from disabling the alarm system. The three wires from the reed relay 48 are connected to a microprocessor 58 containing an erasable programmable read only memory (E-PROM) 61 that controls the operation of the alarm panel 20 by the microprocessor 58. This microprocessor 58 sequentially polls the contacts 52, 54 of each connector unit 1, to detect actuation of their reed relays 48 by the photodiodes 46. When the microprocessor 58 detects that a relay 48 is not actuated, it initiates the alarm sequence provided by the E-PROM for that connector unit, as described above. The annunciator panel can be designed at any level of sophistication or complexity in order to provide notice that a control member has been tampered with or changed.

Thus, the security apparatus can be used with a plurality of valves or devices with movable control members. Such a security apparatus comprises a plurality of discrete continuous optical fibers, each fiber being physically securable to a movable control member of one of the devices, and a plurality of connector units. The connector units include means for electrically wiring each connector unit to a remote control monitoring means that comprises means responsive to a loss of one of the electrical signals for providing an alarm indication. The connector units can also be designed to radio signal the remote control monitoring system, thus the means for communicating between the connector units and the remote control monitor means can be hard wiring, radio signaling, or any other method of communication.

Figure 3A:
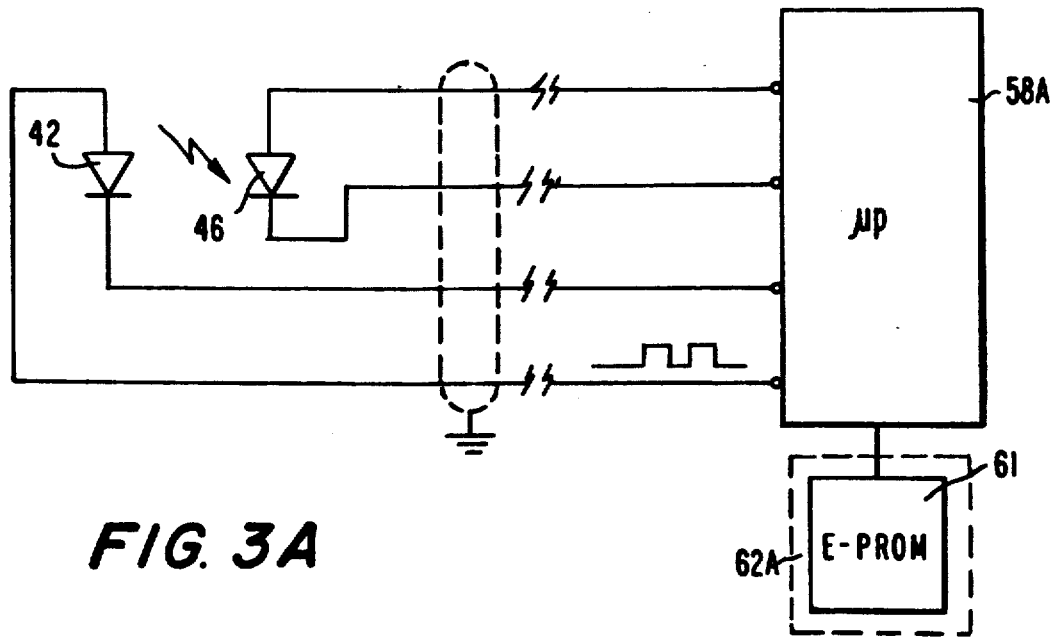

Alternatively, a distinctive encoded signal (or pattern) may be provided to each of the connector units 1 by the microprocessor 58a, as shown in FIG. 3A. For instance, the microprocessor 58a may be programmed to repeatedly send a digital signal corresponding to the ASCII code for the letter "C" to the LED 42. Then, when the microprocessor 58a fails to receive the characteristic signal that it provides to the LED 42 in a particular connector unit 1 from the corresponding photodiode 46, the microprocessor 58a will generate an interrupt that initiates the alarm operation described above. The characteristic pattern provided by the microprocessor 58a to each connector unit is also stored in the E-PROM 60 that controls the microprocessor.

If the signal received from a connector unit does not match the stored signal pattern for that connector unit whether it is a steady state signal indicating a broken optical fiber or an inappropriate coded signal that has been supplied in place of the characteristic signal for that input, the alarm sequence for that particular connector unit is initiated, as explained above.

Figure 4:
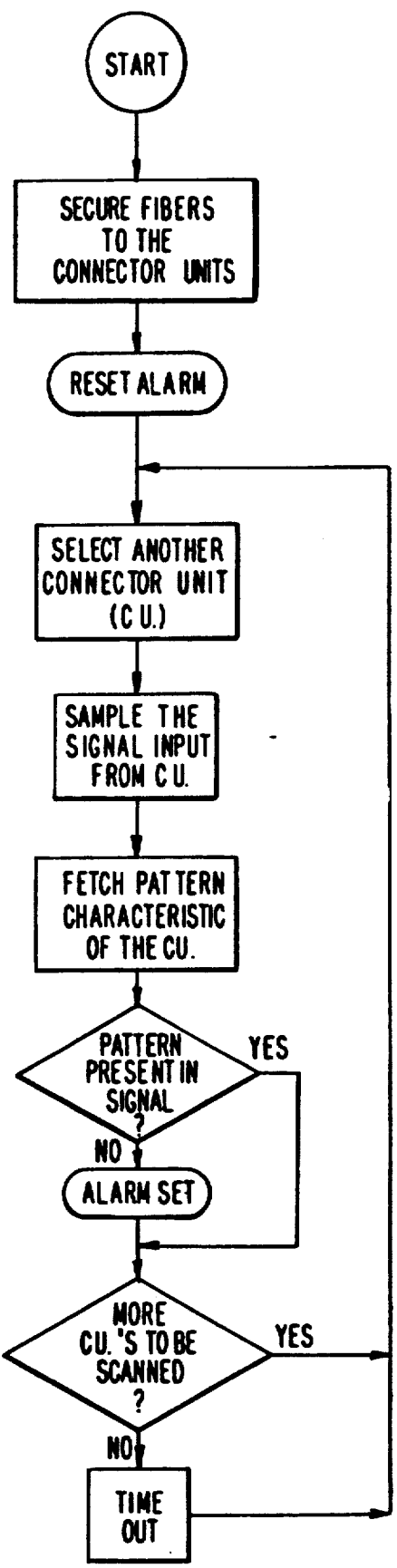
FIG. 4 is a flow chart of the operation of a central alarm annunciator panel in accordance with the present invention.

FIG. 4 shows a flow chart for the system that uses distinctive encoded signals (or characteristics patterns). FIG. 4 shows that after the optical fibers are secured and the alarm is reset, the microprocessor samples each connector unit for its particular characteristic pattern. The microprocessor selects a connector unit, samples its signal input, and fetches the characteristic pattern of the connector unit. If the characteristic pattern is present in the signal input then the next connector unit is sampled, if not, the alarm is set off.

The E-PROM that controls the operation of the annunciator panel 20 is contained in a chip 62. Thus, it can be easily interchanged with semiconductor chips containing other programs or removed for reprogramming to change the operation of the alarm system when new connector units are added, or other alarm functions or alarm messages for the respective connector units are needed. For example, the open and closed positions of any one valve 6 may be monitored independently so that a distinctive message is provided on the display panel 26 if the valve handle 4 is moved from either position. In such a situation the message that is displayed will be determined by the present authorized position of the valve 6. For this purpose another, separate connector unit IA (FIG. 1) is added together with its own optical fiber 12A so that either of these two positions of the valve handle 4 shown in FIG. 1 can be monitored. The E-PROM is then altered so that it causes the alarm system's microprocessor to relate the output of these two connector units in a logical "OR" function, so that an alarm will occur only if neither of the connector units has a complete light path. The altered E-PROM also instructs the microprocessor to store data indicating which of the two related detectors had a complete light path before the alarm condition occurred. The message displayed by the annunciator panel 20 at the nursing station will then be the alarm message programmed for whichever connector unit is currently monitoring the authorized position of the valve handle 4.

If the incoming power to a connector unit is interrupted the connector unit goes into an alarm state and signals an alarm condition. This is a fail safe method which signals when power is interrupted or removed from the system.

The above described invention can be modified to provide a security fiber optic lock system that is also a low power device. In a preferred embodiment, the low power device is achieved by transmitting pulses of light, either in the visible or infrared region, through one end of an optical fiber and detecting such pulses at the other end of the optical fiber by a photo-detector. The detected light is processed by additional circuitry to operate a solid state relay switch which is connected to an external computer for monitoring a fault condition in the event that the optical fiber is either removed or broken.

Figure 5:
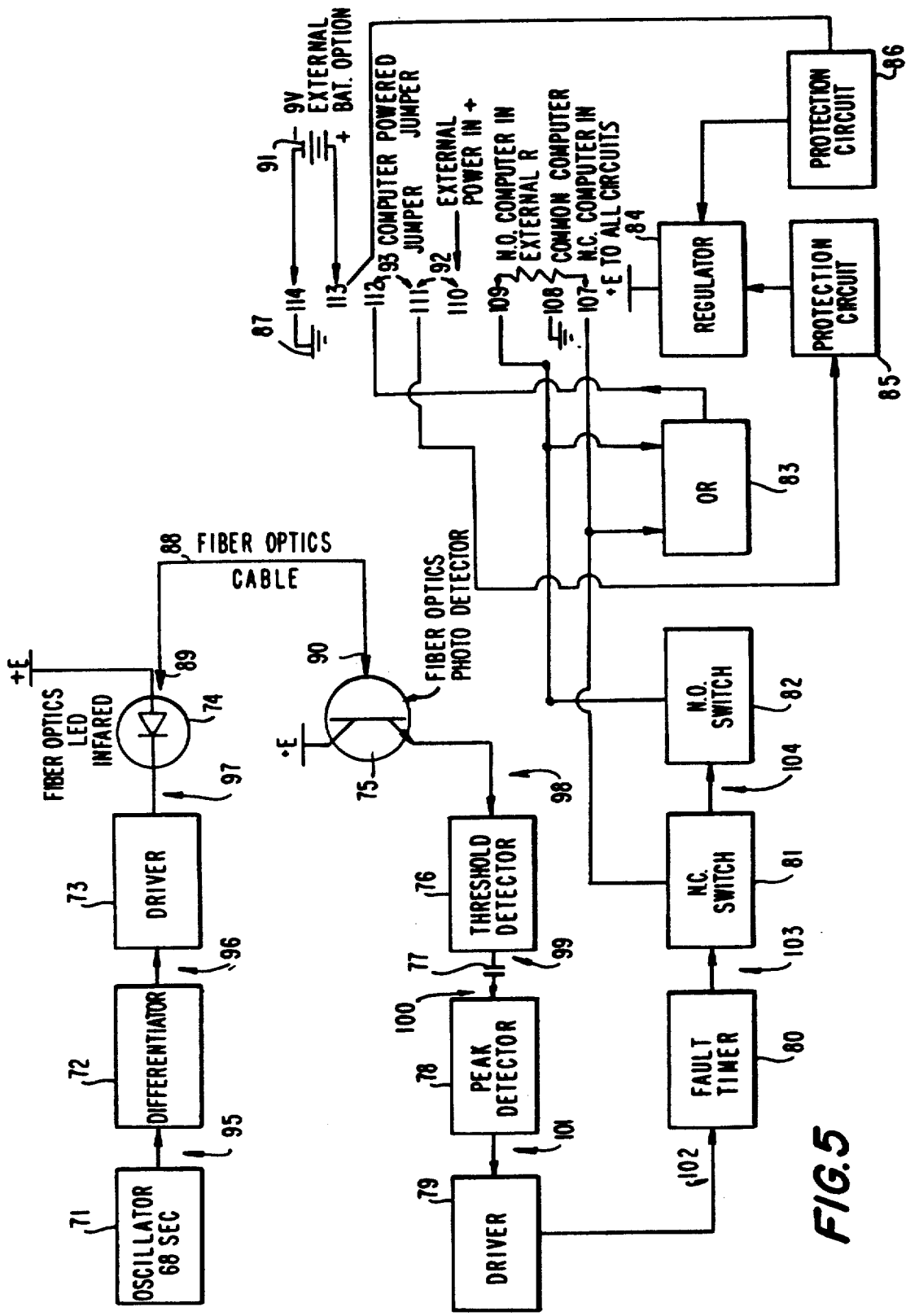
FIG. 5 is a block diagram of a low power, pulse system in accordance with the present invention.

FIG. 5 shows the block diagram for the low power system. A free running oscillator 71 generates a square wave 95. The square wave is differentiated 72 and the positive portion of the differentiated wave form 96 is used to trigger a Schmidt LED driver 73 which produces a current pulse 97. The driver 73 is coupled to an infrared fiber optics LED 74 and the current pulse 97 from the driver 73 turns on the LED 74 for about 1 millisecond for each period of time resulting in a 1000 to 1 duty cycle, with about 3 milliamps peak to peak current through the LED. A fiber optics cable 88, corresponding to cable 12 of FIG. 1, is attached to a connector 89, corresponding to connector 1 of FIG. 1, of the fiber optics LED 74 which transmits pulsed infrared light to the other end of the fiber optics cable, through connector 90 and into a phototransistor receiver 75 (or photodetector). The photo-detector 75 detects the pulsed light and converts it into electrical signals representative of the detected light pulses.

The low powered, pulse system can generate light at a determined frequency and includes means for filtering out signals at frequencies below the determined frequency. Alternatively, the system can generate light pulses in a range of determined frequencies and include means for filtering out signals not in said range. For example, the system can generate light pulses between 1-3 Hz. If the system detects any signals out of the 1-3 Hz range a fault condition will occur. A third alternative, is the system transmitting and detecting random frequency pulses.

Signal processing means are connected to the photo-detector 75 for processing the electrical signals representative of the detected light pulses. Since the amplitude of the pulse 98 will vary with the length of the fiber optics cable, or its position within the connector, or the gap between the cable end and the infrared LED or photo-detector in the connector unit, a threshold detector 76 is connected to the output of the photo-detector 75. When the amplitude of the pulse 98 reaches about ½ V+, the threshold detector 76 will turn on and then, when the pulse returns to the same level, turn off resulting in alternating-current 99. The alternating-current 99 is coupled through a capacitor 77 to a peak detector 78.

The purpose of the capacitor 77 is to provide a high pass filter and thereby retard 60Hz light from triggering a false output condition. The capacitor 77 also blocks ambient light signals from triggering false outputs.

When a series of pulses are provided due to a completed fiber optics path 88, 89, 90, the peak detector 78 will produce a sawtooth ripple voltage from +E1 to +E2 which is inputted to an output driver 79. The output driver 79 is coupled to a fault timer 80.

A fault timer 80 is used to turn on either normally-closed (NC) or normally opened (NO) switches 82 and 81 very quickly, and allows the switches to remain in a fault condition for a period of time long enough to have the fault condition detected. For example, though the fiber optics cable can be pulled out from its connector, breaking the light circuit, and replaced in less than one second (but not less than 4 milliseconds), the NO and NC switches 81, 82 will switch and a fault condition will be stored for a period of time at least greater than 7 seconds, even with the fiber optic cable re-connected. A conventional timing means or computer software timing can be used to implement this operation. A computer can be programmed to sequentially monitor the signals processed from each of the optical fibers.

The power to operate the fiber optics lock is provided through one of several different means depending on the application of the device. A screw terminal connector 87 provides 8 different screw input terminals 107-114.

External power from a remote power supply, say a 12V DC wall adaptor, is connected with its positive side to terminal 113 and its negative side to terminal 114. An external jumper 93 provides a current path to terminal 111 and through the protection circuit 85. A voltage regulator 84 for the circuit limits the V+ voltage to +5.1 volts.

A second method used to provide power for the fiber optics lock system is by battery, such as a 9V carbon or alkaline radio battery. Since the entire circuitry only draws about 25 microamps of current, this type of battery will last about 1 year, continuously. The battery is connected with its positive terminal at 113 and its negative terminal at 114 of terminal connector 87. The protection circuit 86 operates in a fashion similar to protection circuit 85 and as described below in detail.

A third method used to provide power for the fiber optic lock system is through a remote computer output port such as a 4 to 20 ma loop.

An OR circuit 83 will provide the DC power to the system when terminal 112 is connected to terminal 111. The power will be supplied through either the NO or NC switch depending upon which is active V+. It will also provide power in the NC switch condition provided at least 4V DC is available through the computer under a NC condition.

The power source for both the NC switch 81 and NO switch 82 are derived from the computer output port. Some surveillance terminals require a load resistor at the end of a computer port line and may be anywhere from 1 K to 100K. This resistor is applied to terminals 107 and 109.

The state of the NC switch 81 provides a DC voltage at 104 (FIG. 5) of near 0 volts DC. This voltage is coupled to the gate of the NO switch 82 whose output is the opposite of that at 104.

Figure 6:
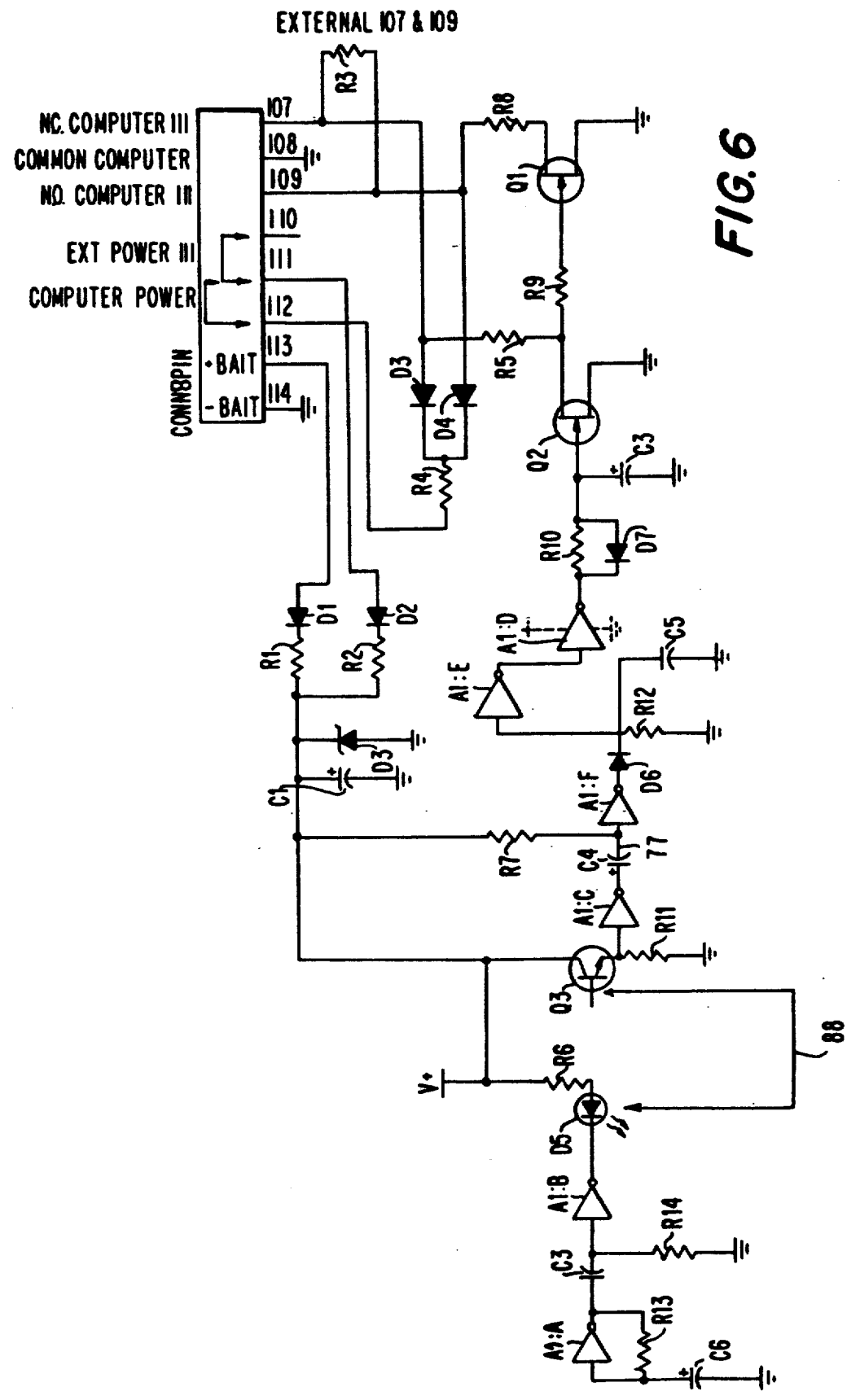

The detailed circuitry of the low power system is shown in FIG. 6. Amplifier A1:A, resistor R13 and capacitor C6 are the components of the oscillator 71 of FIG. 5 as previously described. Capacitor C3 and resistor R14 are used as the differentiator 72. Amplifier A1:B is the Schmidt LED driver 73. The LED transmitter 74 consists of diode D5 and resistor R6 while the photodetector 75 consists of phototransistor Q3 and resistor R11.

The threshold detector 76 consists of amplifier A1:C and the peak detector consists of amplifier A1:F, resistor R7, diode D6, resistor R12, and capacitor C5. The output of amplifier A1:F is normally held low since resistor R7 is used to bias the input of amplifier A1:F to V+. The pulse signal through capacitor C4, corresponding to 77 in FIG. 5, turns off the output of amplifier A1:F. Peak detection is done by diode D6 and filtered by capacitor C5. Resistor R12 and capacitor C5 comprise a rectifier.

The output driver 79 consists of amplifier A1:E and amplifier A1:D. Operational amplifier A1:D inverts the DC level at the output of A1:E for proper operation. When a series of pulses of proper waveform are provided due to a completed fiber optics path 88 the capacitor C5 will charge up to a DC level between +E1 and +E2. Resistor R12 causes a sawtooth ripple voltage from +E1 to +E2.

Means are provided connected to the signal processing circuitry for indicating when the power source to the system is not sufficient to operate the electronics for transmitting, receiving and processing the pulsed light and representative electrical signals. Furthermore, means are provided, connected to the signal processing means, for distinguishing among electrical signals representative of the detected light pulses and the absence of detected light pulses due to removal or breakage of the optical fiber. The DC voltage to the input of amplifier A1:E must be greater the ½ V+ and less than +E1 for the low value of the sawtooth ripple voltage to turn on amplifier A1:E for a solid DC level at the output of amplifier A1:E. If +E1 is less than ½ V+, then the output will be chopped at the frequency of oscillator 71, consisting of amplifier A1:A, resistor R13 and capacitor C6. This will result in the circuit working improperly and the field effect transistors Q1 and Q2 turning on and off at the oscillator rate thereby alerting the remote computer of a low battery state either external or internal to the fiber optics lock system. The field effect transistors Q2 and Q1 implement the normally-closed (NC) and normally-opened (NO) switches each having respective normally-closed and normally-open contacts.

Both normally-closed and normally-opened switches are provided in the circuitry to allow the user to choose between which condition he prefers to use in his application. Both switches always operate inverted with respect to one another, and either can be used. In the following operation sequence, we will describe the circuitry using the normally-closed switch Q2.

Under normal operating conditions with the fiber optics cable properly connected, the DC output voltage at the output of amplifier A1:D is V+. When starting or resetting the system, the output of amplifier A1:D goes from 0 volts to V+ and the voltage charges capacitor C3 through resistor R10 and turns on the field effect transistor Q2. The turn-on time is determined by the RC time constant of resistor R10 and capacitor C3, which is approximately seven seconds. The RC time constant can be anywhere between 7-15 seconds so long as it is longer then it takes for a polling sequence by the computer to occur. When a fault condition occurs due to a break in the fiber optics path, the output of amplifier A1:D goes quickly to 0 volts. The voltage on capacitor C3 is quickly discharged through diode D7 bypassing resistor R10 to ground resulting in the field effect transistor Q2 quickly turning off and signaling the computer of a fault condition. When a fault occurs, the state of Q2 is switched fast due to the immediate discharge of capacitor C3. The switched state is maintained, however, due to the RC time constant of resistor R10 and capacitor C3, even after the output of amplifier A1:D goes back to V+ as described above, because now the diode D7 is back biased. The switched state is maintained for a long enough period of time so that a fault condition can be detected and processed by the computer. The computer determines between authorized and unauthorized fault conditions and processes each accordingly.

Diode D2 and resistor R2 comprise a protection circuit 85. Diode D2 protects the remainder of the circuit in the event of external power supply reversal and resistor R2 limits the input current to the circuitry. The voltage regulator 84 for the circuit limits the V+ voltage to +5.1 volts DC through zener diode D3. A capacitor C1 filters this supply voltage.

Diode D1 and resistor R1 comprise the protection circuit 86 and operate in a similar fashion to diode D2 and resistor R2 described above. Diodes D3, D4 and resistor R4 comprise the OR circuit 83 previously described.

FIGS. 7A-7G show the waveforms 95-101 which correspond to FIG. 5. For example, FIG. 7A shows the square waveform 95 generated by the oscillator 71 whose normal period is between ½ and 1 second. FIG. 7B shows differentiated waveform 96 which the positive portion of is used to trigger the Schmidt LED driver 73. FIG. 7C shows the pulse current 97 which turns on the LED 74 and FIG. 7D shows the pulse 98 received by the photodetector 75 previously described. FIG. 7E shows the output pulse (or alternating-current) 99 of the threshold detector 76 and FIG. 7F shows the pulse 100 filtered by the capacitor 77. FIG. 7G shows the sawtooth ripple voltage 101 of resistor R12 previously described.

The invention has been described with particular reference to preferred embodiments of the invention, as illustrated. However, it will be apparent to one skilled in the art that other variations and modifications can be made within the spirit and scope of the invention defined by the claims. In particular, the presently preferred embodiment is a system directed to monitoring hospital gas distribution and sprinkler systems in which the operating status of the valve, on or off, is commonly the condition being monitored. However, the invention is not limited to this type of system. For example, it can also be used to secure a flow-rate that is set by a given position of a valve actuator, which is particularly useful in manufacturing or industrial process control applications. Furthermore, the security system and method described can work with any security apparatus that has a movable control member and is not limited to valves having movable control members. For example, movable members on an electrical box or locker can use the security system and method described to secure such devices.

I claim:

1. In a security apparatus comprising plural devices each having a movable control member and plural optical fibers each coupled to one of the movable control members and mounted to optical connectors such that the optical fiber has to be removed from its connector in order to move its coupled control member; means for determining the removal or breakable of an optical fibre, said optical fiber removal or breakage determining means comprising:

(a) means for generating light pulses within a range of predetermined frequencies, and transmitting said light pulses via a connector to one end of a fiber, (b) means at the other end of the fiber for detecting light and converting same into electrical signals representative of detected light pulses if present, (c) signal processing means connected to the light detecting means for processing its electrical signals, (d) a power source connected to the means of elements (a), (b), and (c) for operating same, (e) means connected to the signal processing means for indicating when the power source is not sufficient to operate the means of elements (a), (b) and (c), said indicating means comprising a means for filtering out signals at frequencies outside said range of predetermined frequencies, (f) means connected to the means of element (c) for distinguishing among electrical signals representative of the detected light pulses and the absence of detected light pulses due to removal or breakage of an optical fiber.

2. The apparatus of claim 1, wherein the means of (e) comprises at least one switch, and means for causing said switch to change state at a high rate when the power source falls below a certain value.

3. The apparatus of claim 1, wherein the means of (e) comprises first and second switches, said first switch having normally-open contacts, said second switch having normally-closed contacts.

4. The apparatus of claim 3, wherein the means of (f) comprises means connected to the first and second switches for rapidly changing the on-off state of at least one of said switches.

5. The apparatus of claim 4, wherein the means of (f) further comprises means for storing the switched on-off state of at least one of said switches so that said state is maintained for a minimum determined time.

6. The apparatus of claim 5, wherein the means of (f) further comprises timing means.

7. The apparatus of claim 1 wherein the means of (e) comprises a computer programmed to monitor sequentially the signals processed from each of the optical fibers.

8. The apparatus of claim 1, wherein the light transmitting and detecting means for each fiber is located in the connector adjacent said fiber, and the signal processing means is remote and common to all of the connectors.

9. The apparatus of claim 1, wherein said generating means (a) comprises an oscillator for generating waves, a differentiator for differentiating said waves, a driver connected to said differentiator for producing current pulses, an LED coupled between said driver and said optical fiber coupled to said driver for receiving said current pulses.

10. The apparatus of claim 9, wherein said detecting light means (b) comprises a photodetector for detecting the pulsed light and converting light into electrical signals representative thereof.

11. The apparatus of claim 10, wherein said signal processing means (c) comprises a threshold detector to the output of the photodetector for producing an alternating current, a peak detector connected to said threshold detector, a filtering means connected to said threshold detector for filtering out frequencies, a driver connected to said peak detector, a timer connected to said driver, and switches connected to said timer, said timer switching said switches and allowing a switching state long enough to have condition detected.

* * * * *